United States Patent [19]
Adams

[11] Patent Number: 5,840,259
[45] Date of Patent: Nov. 24, 1998

[54] BOILING POINT REACTOR WITH HEAT REMOVAL

[75] Inventor: John R. Adams, Houston, Tex.

[73] Assignee: Catalytic Distillation Technologies, Pasadena, Tex.

[21] Appl. No.: 42,524

[22] Filed: Apr. 5, 1993

[51] Int. Cl.$^6$ .................................................. B01J 8/04
[52] U.S. Cl. .......................... 422/191; 422/211; 422/201
[58] Field of Search ..................................... 422/191, 211, 422/201

[56] References Cited

U.S. PATENT DOCUMENTS

| | | | |
|---|---|---|---|
| 2,006,078 | 6/1935 | Pyzel | 422/191 |
| 2,220,849 | 11/1940 | Riblett | 422/191 |
| 2,271,646 | 2/1942 | Kassel | 422/191 |
| 2,306,011 | 12/1942 | Burk et al. | 422/200 |
| 2,431,803 | 12/1947 | Guyer et al. | 422/211 |
| 2,438,467 | 3/1948 | Tyson et al. | 422/191 |
| 2,443,423 | 6/1948 | Helmers | 422/200 |
| 2,458,435 | 1/1949 | Simpson | 422/191 |
| 2,469,329 | 5/1949 | Crowley | 422/200 |
| 2,512,562 | 6/1950 | Cummings | 422/191 |
| 2,548,295 | 4/1951 | Fahnestock | 422/191 |
| 2,783,249 | 2/1957 | Joeger et al. | 422/211 |
| 2,816,010 | 12/1957 | Shabaker | 422/200 |
| 3,556,737 | 1/1971 | Boyd | 422/191 |
| 3,592,013 | 7/1971 | Boyd | 422/191 |
| 3,595,626 | 7/1971 | Sowards | 422/211 |
| 3,652,450 | 3/1972 | Boyd | 422/191 |
| 3,697,416 | 10/1972 | Carson et al. | 422/191 |
| 4,186,171 | 1/1980 | Stoddard et al. | 422/191 |
| 4,259,312 | 3/1981 | Flockenhaus et al. | 422/191 |
| 4,400,493 | 8/1983 | Abernathy, Jr. et al. | 526/68 |
| 4,542,252 | 9/1985 | Graziani et al. | 422/200 |
| 4,950,803 | 8/1990 | Smith, Jr. et al. | 568/697 |
| 5,003,124 | 3/1991 | Smith, Jr. et al. | 585/526 |
| 5,084,247 | 1/1992 | Heisel et al. | 422/200 |

FOREIGN PATENT DOCUMENTS

| | | | |
|---|---|---|---|
| 0323663B1 | 4/1992 | European Pat. Off. . | |
| 3513912 | 10/1985 | Germany | 422/200 |

Primary Examiner—William H. Beisner
Attorney, Agent, or Firm—Kenneth H. Johnson

[57] ABSTRACT

In a boiling point reactor wherein reactants react exothermically to vaporize a portion of the reaction mixture in a fixed catalyst bed, a cooling coil is provided within the bed which condenses a portion of the vaporized reaction mixture. The condensing heat transfer coefficient within the bed is thus increased dramatically and efficient heat removal is achieved.

1 Claim, 2 Drawing Sheets

BOILING POINT REACTOR WITH HEAT REMOVAL

BACKGROUND OF THE INVENTION

Temperature control for exothermic reactions has been achieved in the past in a number of ways. One such method has been to place cooling coils within the catalyst bed to remove the heat of reaction. This type of reactor has commonly been referred to as an adiabatic reactor. While this arrangement is useful on a small scale, larger reactors and catalyst beds present problems. The low liquid velocities required to achieve the desired residence times in the catalyst bed provide very poor heat transfer coefficients and inefficient cooling.

Another method used, especially where one of the reactants is gaseous, is to introduce cold reactant or "quenches" along the length of the catalyst bed. This type of cooling has been effectively used in such reactors as hydrocrackers where large quantities of hydrogen are needed. The amount of quench used is limited by compressors and other related gas recycle equipment. Additionally, distribution of the cold gas in larger catalyst beds can create such problems as hot spots.

The adiabatic and quench reactors noted above remove only sensible heat in the reactors and are thus limited by the specific heats of the reactants or quench gases. More efficient temperature control can be achieved in a boiling point or isothermal reactor where the reaction is carried out at a pressure so as to cause vaporization of a portion of the reaction mixture. The latent heat of vaporization absorbs the exothermic heat of reaction and limits the temperature rise in the bed. This, too, has limitations in that in highly exothermic reactions all of the reaction mixture may be vaporized before the desired conversion of reactants is achieved. To solve this problem several reactors may be used in series with the effluent from one reactor being condensed before introduction to the next reactor. In this type of reactor the entire reaction mixture passes through and out of the reactor and contains reactants, products, liquids and gases.

A given composition, the reaction mixture, will have a different boiling point at different pressures, hence the temperature in the reactor is controlled by adjusting the pressure to the desired temperature within the recited range. The boiling point of reaction mixture thus is the temperature of the reaction and the exothermic heat of reaction is dissipated by vaporization of the reaction mixture. The maximum temperature of any heated liquid composition will be the boiling point of the composition at a given pressure, with additional heat merely causing more boil up. The same principal operates in the present invention to control the temperature. There must be liquid present, however, to provide the boil up, otherwise the temperature in the reactor will continue to rise until the catalyst is damaged. This is a substantial departure from the prior art for this type of reactor, where sufficient pressure was employed to maintain the reaction mixture in liquid phase.

The present invention which relates to the liquid phase type of reaction also provides means for removing heat from the fixed continuous catalyst bed. These and other advantages will become apparent from the following descriptions.

SUMMARY OF THE INVENTION

The present invention provides a means of efficient heat removal in the catalyst bed of a boiling point reactor. Cooling coils are placed within the bed at intervals to condense a portion of the vaporized reaction mixture. Because the cooling coils are condensing the mixture in the bed, heat transfer is increased dramatically over conventional adiabatic reactors. Thus efficient heat removal in packed catalyst beds is achieved. In a conventional non isothermal reactor, i.e., liquid phase reactors, the cooling coils are removing only sensible heat of reaction, whereas in the present invention since there are boiling components, condensation heat transfer is obtained. In one embodiment of the invention several cooling coils are arranged in a large catalyst bed in a downflow boiling point reactor such that each cooling coil is condensing the vapor from a point above the coil within the bed. To achieve high heat transfer coefficients, the coils should be in a packed portion of the bed to insure the necessary vapor velocities which improve the condensing heat transfer coefficients.

In a second embodiment several beds of catalyst may be placed in the reactor separated by inert packing. The cooling coils are placed in the inert packing to condense the vapor from the catalyst bed directly above.

The catalyst bed may be described as a fixed continuous bed, that is, the catalyst is loaded into the reactor in its particulate form to fill the reactor or reaction zone, although there may be one or more such continuous beds in a reactor, separated by spaces devoid of catalyst and/or inert particulate material.

DESCRIPTION OF THE PREFERRED EMBODIMENTS

Figure 1:
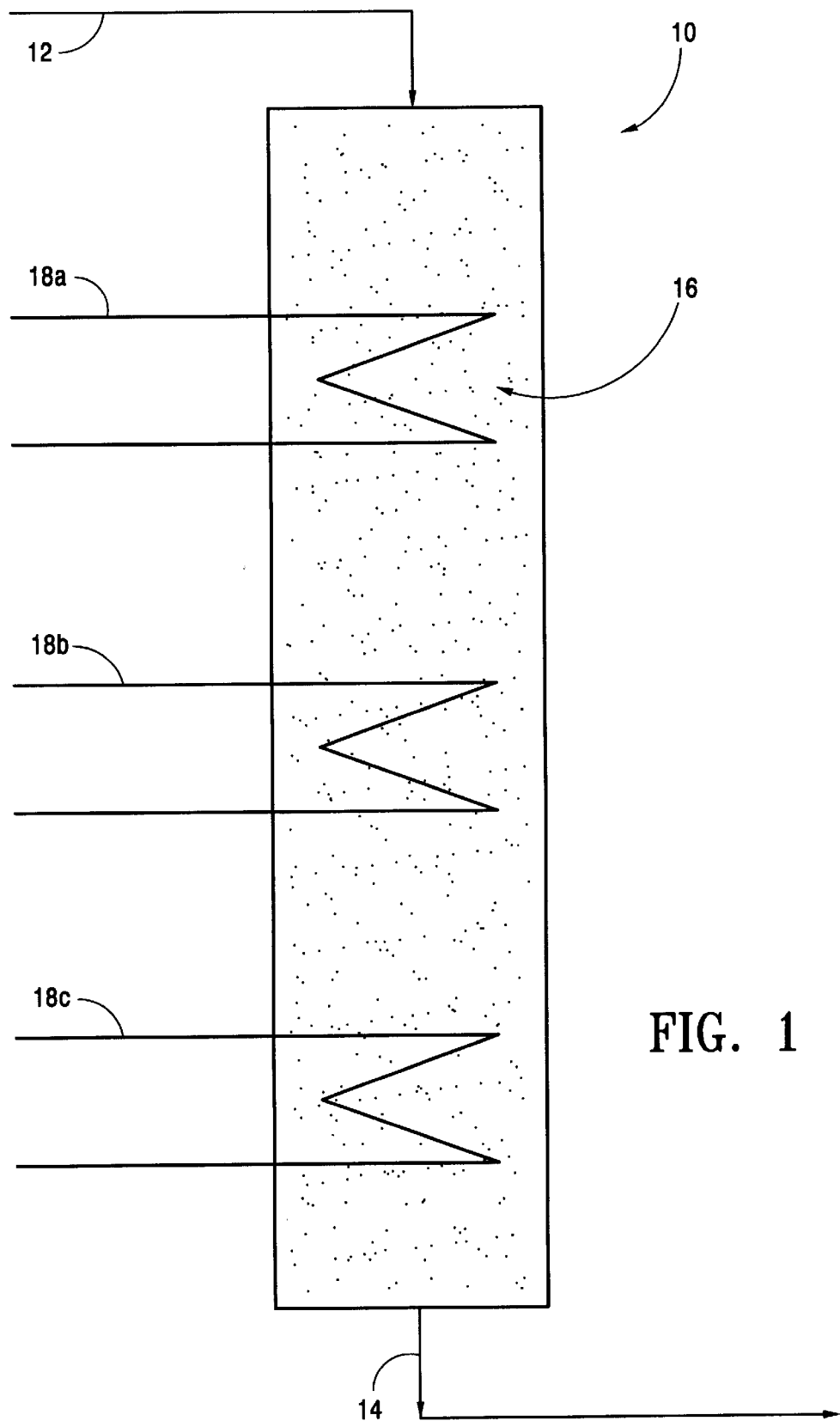
FIG. 1 is a schematic representation of one embodiment of the present invention.

In FIG. 1 there is shown a boiling point reactor, generally indicated at 10, which is filled with catalyst 16 appropriate for carrying out an exothermic reaction. The reactants enter the reactor through inlet 12.

The temperature in the reactor is thus controlled by the pressure used. The temperature in the reactor and catalyst bed is limited to the boiling point of the mixture present at the pressure applied, notwithstanding the magnitude of the exotherm. A small exotherm may cause only a few percent of the liquid in the reactor to vaporize whereas a large exotherm may cause 30–90% of the liquids to vaporize. The temperature, however, is not dependent on the amount of material vaporized but the composition of the material being vaporized at a given pressure. That "excess" heat of reaction merely causes a greater boil up (vaporization) of the material present. As the reactants flow downwardly through the catalyst bed 16, the heat of reaction is absorbed by the reaction mixture which causes a portion of the mixture to vaporize. The mixed gas and liquid phases pass downward through the bed and contacts first cooling coil 18a where the gaseous portion of the mixture is condensed. The condensation cooling provides efficient heat transfer coefficients and effective removal of a portion of the latent heat of condensation of the gases.

The reaction mixture containing cooled material from the first cooling coil 18a passes down through the bed 16 where further reaction and vaporization occur. The new reaction mixture then contacts second cooling coil 18b where the vapors formed are again condensed removing a portion of the latent heat of condensation.

The reaction mixture than again proceeds through the catalyst bed 16 reacting and vaporizing a portion of the mixture which is contacted by third cooling coil 18c and a third time a portion of the latent heat of condensation is removed. The length of the bed and number of coils may be adjusted to achieve the desired conversion of reactants with the final mixture exiting the reactor through outlet 14.

Liquid redistribution trays (not shown) may be desirable at different locations within the bed to prevent channeling. An appropriate placement of some of the redistribution trays would be directly below the condensing coils where the volume of liquid is suddenly increased.

Because the concentration of reactants is decreasing due to consumption by the reaction as the mixture flows downward through the bed, there will be less heat generated and consequently less of the mixture will be vaporized. Thus, the size and location of the coils within the bed can be adjusted to provide maximum heat removal and the most efficient temperature control.

Figure 2:
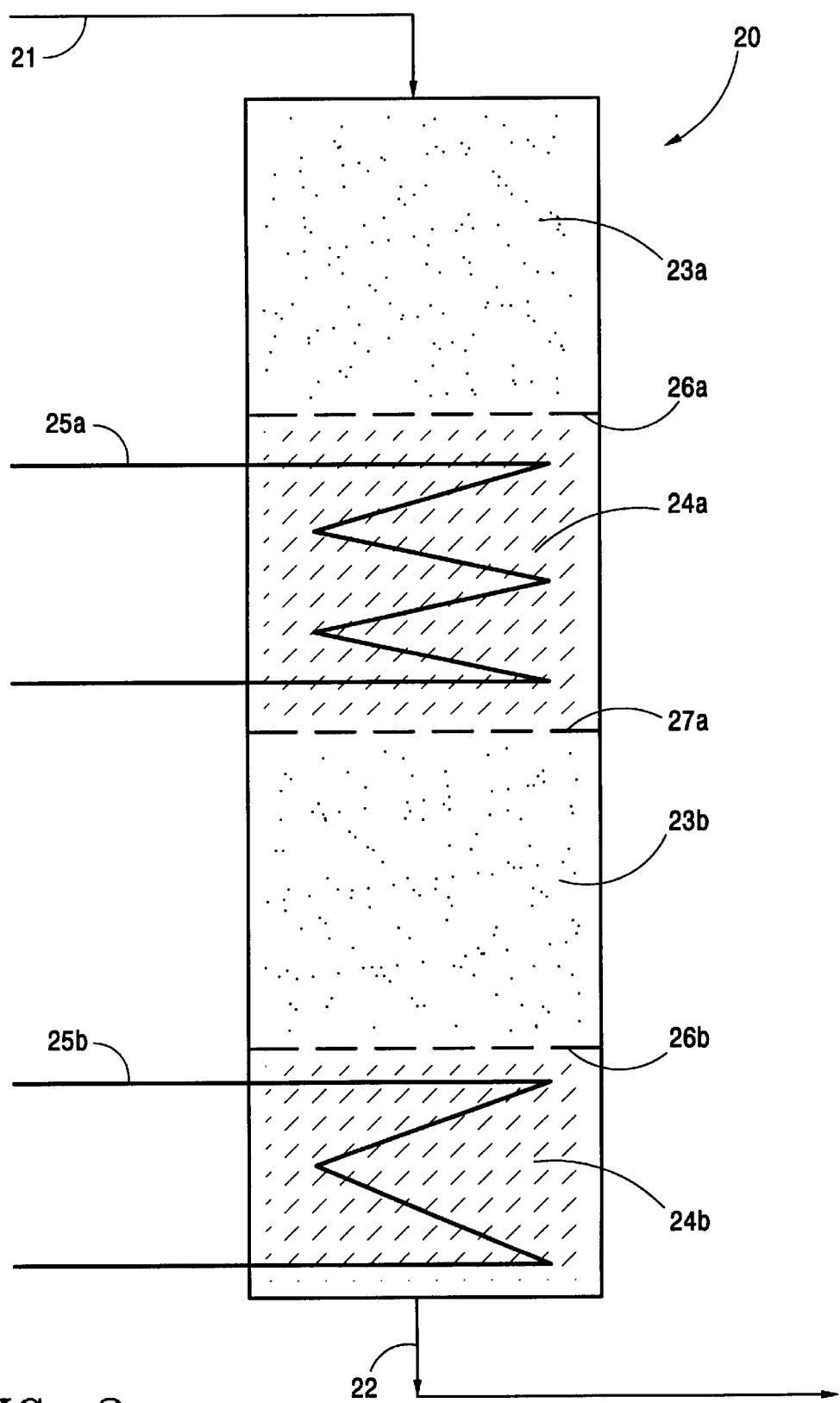
FIG. 2 is a schematic representation of a second embodiment of the present invention.

Referring now to FIG. 2 an alternative embodiment of the present invention is shown in schematic form. The reactor, generally indicated at 20, is shown to contain two catalyst beds 23a and 23b separated by beds of inert packing 24a and 24b. The catalyst beds 23a and 23b are shown to be supported by trays 26a and 26b which may also act as redistribution trays. Inert packing in bed 24a is shown supported by a liquid distribution tray 27a.

The reactants enter the reactor 20 through inlet 21 and are passed over suitable catalyst 23a where a portion of reactants react exothermically partially vaporizing the resultant reaction mixture. The two phase reaction mixture then passes downward through a cooling bed containing inert packing 24a where it is contacted with cooling coil 25a in the inert packing bed. The inert packing insures that the vapor velocity is sufficiently high to improve the condensate heat transfer coefficient to substantially condense the vapor in the mixture. Liquid distribute tray 27a supports the inert packing 24a and prevents channeling of the now liquid reaction mixture. A second catalyst bed 23b provides for further reaction and partial vaporization of the reaction mixture. The alternating catalyst bed/cooling bed arrangement may be multiplied until the desired conversion of reactants is achieved with the final product withdrawn through outlet 22.

The invention claimed is:

1. In a boiling point reactor wherein reactants react exothermically to vaporize a portion of the reaction mixture in a vertically disposed fixed bed, wherein the improvement comprises providing as said vertically disposed fixed bed a plurality of alternating particulate catalyst beds and inert packing beds having a cooling coil within each of said inert packing beds for removing heat by condensing a portion of the vaporized reaction mixture.

* * * * *